T. POLJAKOFF-KOWTUNOFF.
DIVIDING TABLE FOR PUNCHING PRESSES.
APPLICATION FILED JAN. 2, 1907.
926,601.
Patented June 29, 1909.
3 SHEETS—SHEET 1.
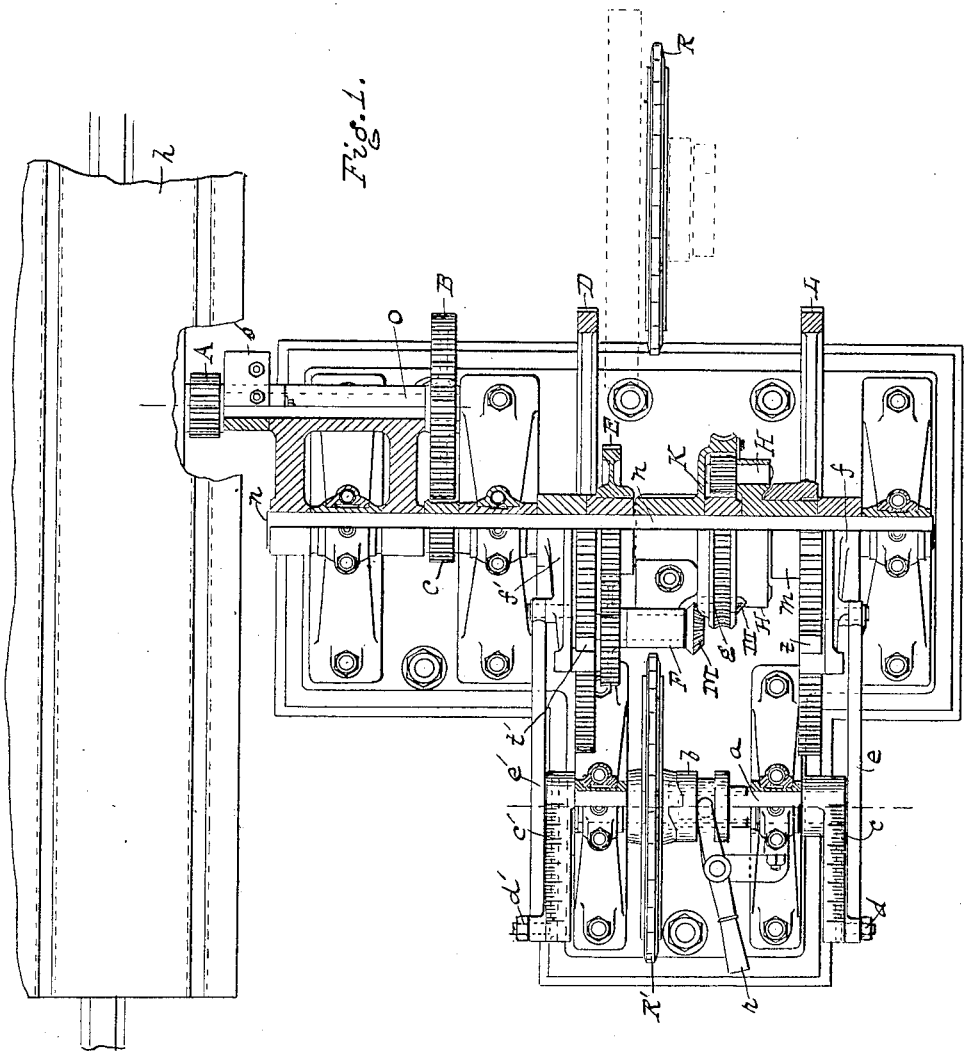
WITNESSES:
INVENTOR,
THEOCTISTE POLJAKOFF-KOWTUNOFF,
BY
ATTORNEY.

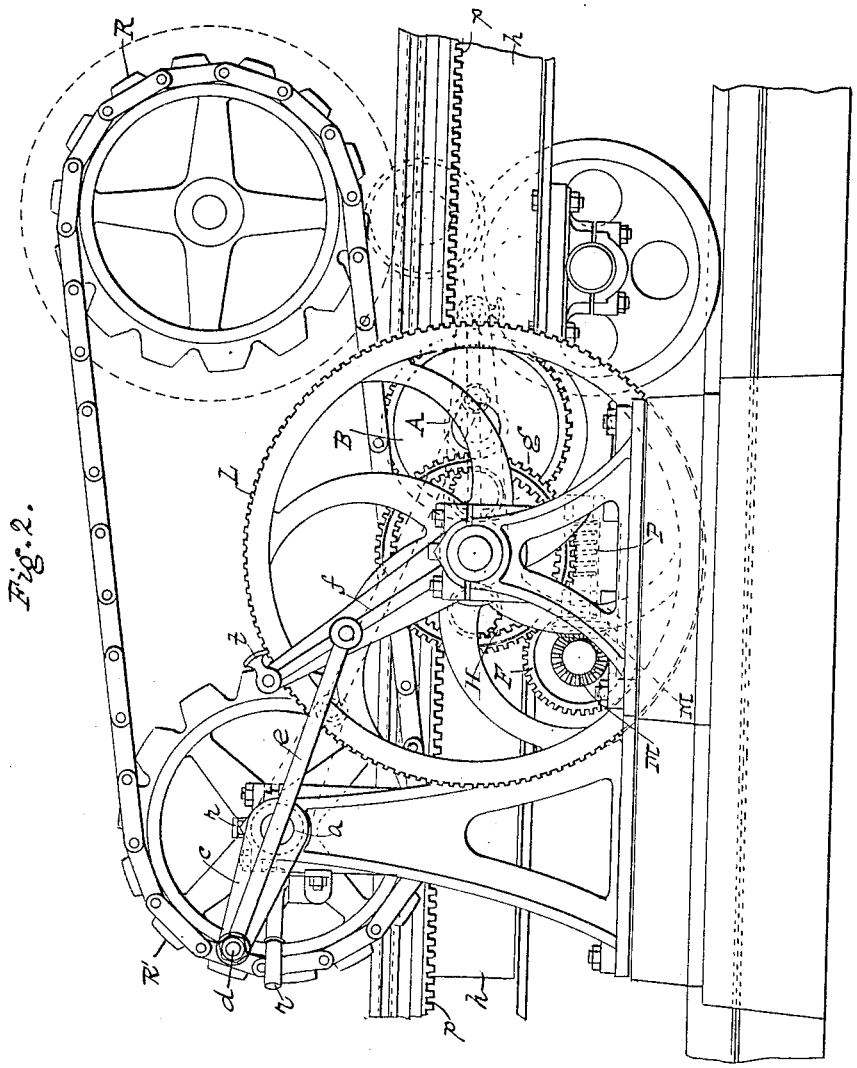

T. POLJAKOFF-KOWTUNOFF.
DIVIDING TABLE FOR PUNCHING PRESSES.
APPLICATION FILED JAN. 2, 1907.
926,601.
Patented June 29, 1909.
3 SHEETS—SHEET 3.
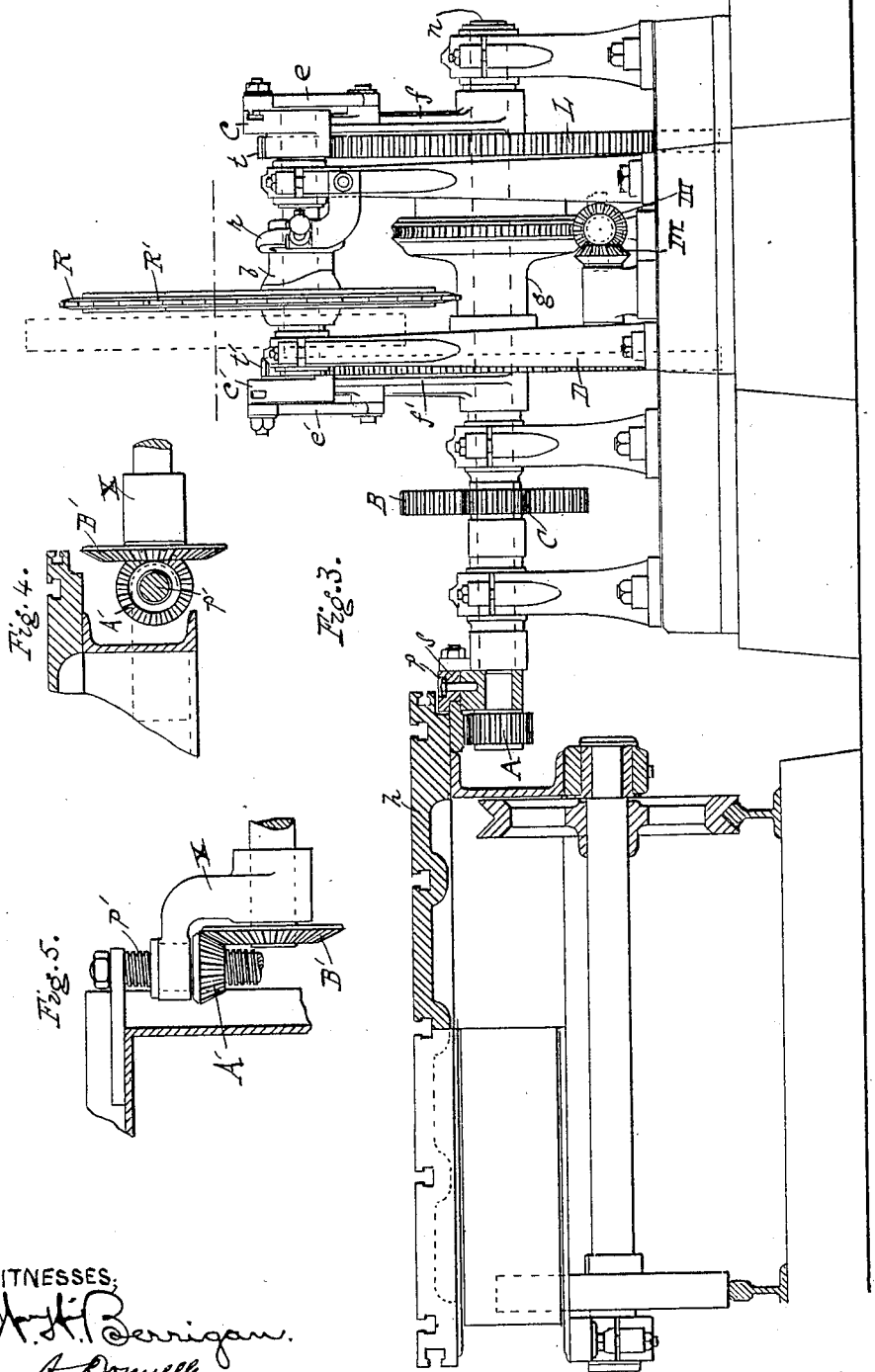
WITNESSES:
INVENTOR,
THEOCTISTE POLJAKOFF-KOWTUNOFF,
BY
ATTORNEY.

UNITED STATES PATENT OFFICE.

THEOCTISTE POLJAKOFF-KOWTUNOFF, OF ST. PETERSBURG, RUSSIA.

DIVIDING-TABLE FOR PUNCHING-PRESSES.

No. 926,601.     Specification of Letters Patent.     Patented June 29, 1909.

Application filed January 2, 1907. Serial No. 350,494.

*To all whom it may concern:*

Be it known that I, THEOCTISTE POLJAKOFF-KOWTUNOFF, a subject of the Emperor of Russia, and resident of St. Petersburg, Russia, have invented certain new and useful Improvements in Dividing-Tables for Punching-Presses, of which the following is a specification.

This invention has for its object a table, which is connected with a punching press and serves to automatically divide and punch holes without preliminary marking.

On the annexed drawing Figure 1 represents a plan horizontal section; Fig. 2 is an end view of the dividing mechanism and side view of the table; Fig. 3 is a section of the table and a side view of the mechanism; Fig. 4 is a side view; Fig. 5 is a plan of a modified arrangement for moving the table.

The table is made for dividing into mm. with an accuracy up to 1/100 mm.

On Figs. 1 and 3, are shown the pulleys and gear wheels of the punching press which is connected with the dividing mechanism by means of a chain and by chain-wheels R, $R^1$. These wheels are disposed, timed and connected in such a manner that when the press is punching a hole, the table stands still and that when the punch of the press is raised, the table moves or feeds the article to be punched. The driven wheel $R^1$, revolves freely on shaft $a$ (Fig. 1) or may be coupled therewith by means of a toothed collar $b$ which is shifted, as desired, by hand lever $r$; on the ends of shaft $a$ are cranks $c\,c^1$ having a groove along which it is possible to move and lock bolts $d$ and $d^1$. These said bolts pivotally engage the ends of links or rods $e$, $e^1$, the other ends of which are pivotally connected, by stationary pins, to levers $f, f^1$; on the ends of levers $f, f^1$ are reversible pawls $t, t^1$ which enter edge teeth of and actuate the gear wheels D and L. Wheel L (serving to divide into mm.) is connected with clutch $m$, which carries two freely-revolving gear wheels H, rolling, when clutch $m$ rotates, along the interior teeth of gear wheel $g$ and, when clutched, actuating the gear wheel K connected to shaft $n$. On the latter, is a gear wheel C, which, by means of gear wheel B and shaft O, transmits movement to gear wheel A; the latter gear wheel moves a table $h$ by engagement with a geared rack $p$. The bearing of shaft O has a guiding slide $s$, (Fig. 3) which, when the table is moving, slides along rack $p$ and holds the rack and gear wheel A from disengagement. The extent of movement of table $h$ varies as the movement of pawl $t$ is adjusted by bolt $d$ on crank $c$.

Wheel D (Fig. 1) serves for dividing into hundreds of mm., and is actuated by pawl $t^1$ which engages the teeth of said wheel; a gear wheel, E, rotates with wheel D, and moves a screw wheel or worm gear $g$ toward the movement of gear wheel L and socket $m$, by means of beveled gears M, M and screw P and thus accelerates the movement of gear wheels H, in accordance with the adjustment of bolt $d^1$ in crank $c^1$ thereby cumulating the two feeds, the amount of feed of wheel D being added to that of wheel L.

Cranks $c$, $c^1$ are furnished with a scale for the speedy adjustment to the desired size of feed.

In order to reverse the movement of the dividing table, pawls $t$, $t^1$ are thrown forwardly or rearwardly as desired, and socket $b$ is, if necessary, to disengage wheel $R^1$ and again coupled, this being done to harmonize the movement of the table with the rise of the punch.

For smaller and more exact divisions, geared rack $p$ may be replaced by screw $p^1$, as shown in Figs. 4 and 5. Screw $p^1$ is fastened rigidly in the ends of the table, gear wheels A, B, C and shaft O are removed and a gear wheel $B^1$, on shaft $n$, revolves gear wheel $A^1$, which has an inside thread and, revolving in a stationary stand X, moves table $h$.

Claims.

1. In a feeding mechanism, the combination of a work supporting device, a shaft for moving said work, a differential gear connecting the work shaft with the main shaft, a unit feeding mechanism connected with the main shaft and operating the differential gear of the work shaft, a fractional ratchet-feeding mechanism adapted to engage the unit feeding mechanism, and means for connecting the two mechanisms and cumulating the two feeds.

2. In a feeding mechanism, the combination of a work supporting device, a screw attached to said support, a bevel gear working on said screw and coöperating with a bevel gear on the main shaft and means for imparting to main shaft unit and fractional feed.

3. In a feeding mechanism, the combination of a work supporting device, a shaft for moving said work, a differential gear connecting the work shaft with the main shaft, a unit ratchet feeding mechanism connected with the main shaft, a fractional ratchet feeding mechanism, a gearing wheel attached to the fractional ratchet feed, and operating a pair of bevel gears actuating a worm, a toothed wheel meshing with the worm, said wheel being toothed and engaging internally with a pair of spur wheels carried by a sleeve, said spur wheels engaging with gears on the main shaft, all said transmitting mechanism being adapted to cumulate the two feeds, substantially as set forth.

In testimony whereof, I have signed my name to this specification in the presence of two subscribing witnesses.

THEOCTISTE POLJAKOFF-KOWTUNOFF.

Witnesses:
H. A. LOVIAGUINE,
EDW. WANSCHEIDT.